United States Patent
Jung

(10) Patent No.: US 9,153,800 B2
(45) Date of Patent: Oct. 6, 2015

(54) BATTERY COVER PROVIDED WITH FIRE EXTINGUISHING FUNCTION

(75) Inventor: Un-Yong Jung, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 0 days.

(21) Appl. No.: 13/996,337

(22) PCT Filed: Dec. 27, 2010

(86) PCT No.: PCT/KR2010/009364
§ 371 (c)(1),
(2), (4) Date: Jun. 20, 2013

(87) PCT Pub. No.: WO2012/091189
PCT Pub. Date: Jul. 5, 2012

(65) Prior Publication Data
US 2013/0264077 A1    Oct. 10, 2013

(51) Int. Cl.
*H01M 2/04* (2006.01)
*H01M 2/12* (2006.01)

(52) U.S. Cl.
CPC ............ *H01M 2/04* (2013.01); *H01M 2/043* (2013.01); *H01M 2/127* (2013.01)

(58) Field of Classification Search
CPC ........ H01M 2/04; H01M 2/043; H01M 2/127
See application file for complete search history.

(56) References Cited

U.S. PATENT DOCUMENTS 3,110,633 A * 11/1963 Bachmann .................... 219/200
7,488,546 B2    2/2009 Kim et al.
2007/0164711 A1    7/2007 Kim et al.

FOREIGN PATENT DOCUMENTS

| CN | 1996640 A | 7/2007 |
|---|---|---|
| DE | 202004004335 U1 | 6/2004 |
| EP | 1876661 A1 | 1/2008 |
| JP | 58-127573 | 8/1983 |
| JP | 07-272751 | 10/1995 |
| JP | 0974603 A | 3/1997 |
| JP | 2003-190312 | 7/2003 |
| JP | 2003-303579 A | 10/2003 |
| JP | 2007-200880 A | 8/2007 |

(Continued)

OTHER PUBLICATIONS

International Search Report (in English and Korean) and Written Opinion (in Korean) for PCT/KR2010/009364; mailed Aug. 29, 2011; ISA/KR.

(Continued)

*Primary Examiner* — Helen O Conley
(74) *Attorney, Agent, or Firm* — Harness, Dickey & Pierce, P.L.C.

(57) ABSTRACT

A battery cover with a fire-extinguishing function is provided, which includes a fire-extinguishing tank disposed on an inner surface of the battery cover to store compressed air and fire-extinguishing fluid, so that the fire-extinguishing tank bursts and the fire-extinguishing fluid contained in the tank is sprayed to the battery to thereby suppress a fire in the case where the fire breaks out inside the battery due to overheat or electric leak of the battery. The battery cover with a fire-extinguishing function is coupled to an opening portion of a case that accommodates the battery therein to protect terminals of the battery in a battery pack, and includes the fire-extinguishing tank disposed on an inner surface of the battery cover to store the fire-extinguishing fluid therein.

8 Claims, 1 Drawing Sheet

(56) References Cited

FOREIGN PATENT DOCUMENTS

| | | |
|---|---|---|
| JP | 2007200880 A | 8/2007 |
| JP | 2008-251263 A | 10/2008 |
| JP | 2009099305 A | 5/2009 |
| JP | 2009099322 A | 5/2009 |
| JP | 2009-099322 | 7/2009 |
| JP | 2009-219257 A | 9/2009 |
| JP | 2010-097836 | 4/2010 |
| KR | 20090026648 A | 3/2009 |
| WO | WO-2009-110200 A1 | 9/2009 |

OTHER PUBLICATIONS

International Preliminary Report on Patentability (Chapter II) for PCT/KR2010/009364 (in Korean), issued Dec. 14, 2012; IPEA/KR.

VB101213PEP Official Communication including Extended European Search Report dated May 13, 2014.

2013-547274 Office Action (no English translation available).

Chinese Office Action for Application No. 201080070884.4 dated Feb. 25, 2015 with English translation (12 pages).

* cited by examiner

BATTERY COVER PROVIDED WITH FIRE EXTINGUISHING FUNCTION

TECHNICAL FIELD

The present invention relates to a battery cover with a fire-extinguishing function. More particularly, the present invention relates to a battery cover with a fire-extinguishing function, which includes a fire-extinguishing tank disposed on an inner surface of the battery cover to store compressed air and fire-extinguishing fluid, so that the fire-extinguishing tank bursts and the fire-extinguishing fluid contained in the tank is sprayed to the battery to thereby suppress a fire in the case where the fire breaks out inside the battery due to overheat or electric leak of the battery.

BACKGROUND ART

A battery is a device that is provided in a construction machine or a vehicle to supply power required to operate an internal combustion engine or various kinds of electronic devices. The battery, which is mounted in a vehicle, has a hollow portion formed therein, and a terminal portion of the battery is provided in a case having one open side to face an opening portion of the battery. Further, on the opening portion of the case in which the battery is accommodated, a cover is put to protect the terminal portion and to prevent inflow of foreign matters from outside.

In the battery mounted in the vehicle or the like, explosion or a fire may occur during vehicle operation. It is estimated that the explosion or fire of the battery occurs due to a short circuit of the terminal portion or unstable chemical materials provided in the battery. However, in many cases, it is difficult to clearly investigate the cause of the explosion or fire. Accordingly, there may be a limit in originally preventing the occurrence of the fire through removal of the cause of the explosion or fire of the battery.

To solve this problem, according to a technology in the related art, a fire-extinguishing device is installed in the vicinity of the battery, and if explosion or a fire occurs in the battery, the fire is automatically suppressed using the fire-extinguishing device. The fire-extinguishing device in the related art is provided with a sensor for sensing the occurrence of fire in the battery and a fire-extinguisher that is connected to the sensor and is installed in the vicinity of the battery, and if the fire occurrence is sensed by the sensor, the fire-extinguisher operates to suppress the fire.

However, the fire-extinguishing device in the related art has the problem that in the case where the sensor is unable to sense the fire occurrence, the fire-extinguisher does not operate. Further, if the spray direction of the fire-extinguishing device is inaccurate or the spray timing is inappropriate although the sensor operates to sense the fire occurrence, complete fire suppression is limited. Further, the fire-extinguishing device in the related art to suppress the battery fire is unable to be installed inside the battery, the overall volume of the battery is increased.

DISCLOSURE

Technical Problem

Therefore, the present invention has been made to solve the above-mentioned problems occurring in the related art, and one subject to be achieved by the present invention is to provide a battery cover with a fire-extinguishing function, which includes a fire-extinguishing tank disposed on an inner surface of the battery cover to store compressed air and fire-extinguishing fluid, so that the fire-extinguishing tank bursts and the fire-extinguishing fluid contained in the tank is sprayed to a fire occurrence region to thereby suppress a fire at early stages in the case where the fire breaks out inside the battery.

Technical Solution

In accordance with an aspect of the present invention, there is provided a battery cover with a fire-extinguishing function, which is coupled to an opening portion of a case that accommodates a battery therein to protect terminals of the battery in a battery pack, including a fire-extinguishing tank disposed on an inner surface of the battery cover to store fire-extinguishing fluid therein.

Advantageous Effects

As described above, according to the battery cover with a fire-extinguishing function according to the aspect of the present invention, since the fire-extinguishing fluid or fire-extinguishing gas can be accurately sprayed to ignition points at an appropriate time without the necessity of a separate detection sensor, the fire can be suppressed at early stages. Further, since the fire-extinguishing tank can be installed in a free space inside the battery, additional manufacturing cost is reduced and a separate installation space is not required.

BRIEF DESCRIPTION OF THE DRAWINGS

The above objects, other features and advantages of the present invention will become more apparent by describing the preferred embodiments thereof with reference to the accompanying drawings, in which.

BEST MODE

Now, a preferred embodiment of the present invention will be described in detail with reference to the accompanying drawings.

Figure 1:
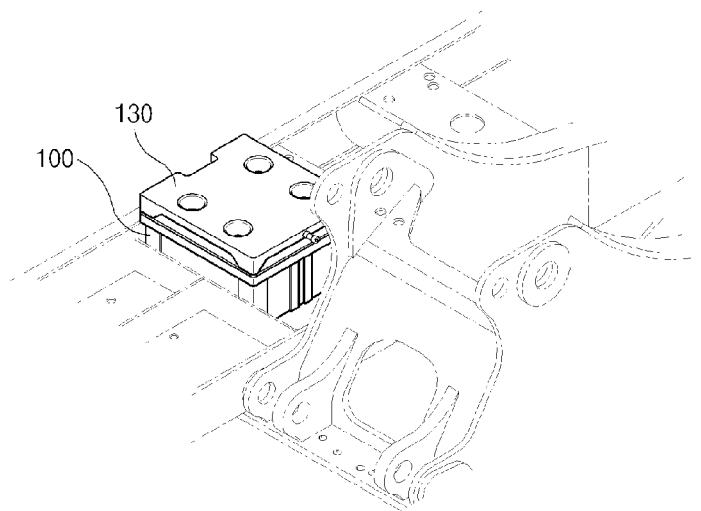
FIG. 1 is a view illustrating a state where a battery cover with a fire-extinguishing function is disposed in an opening portion of a battery according to an embodiment of the present invention.
Figure 2:
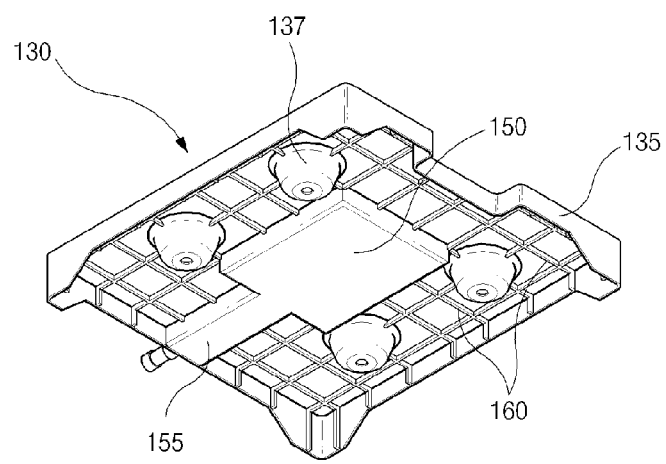
FIG. 2 is a perspective view illustrating the configuration of a battery cover with a fire-extinguishing function according to an embodiment of the present invention.

FIG. 1 is a view illustrating a state where a battery cover with a fire-extinguishing function is disposed in an opening portion of a battery according to an embodiment of the present invention. FIG. 2 is a perspective view illustrating the configuration of a battery cover with a fire-extinguishing function according to an embodiment of the present invention, and FIG. 3 is a view illustrating an installation state of fluid tubes of a battery cover with a fire-extinguishing function according to an embodiment of the present invention.

Figure 3:
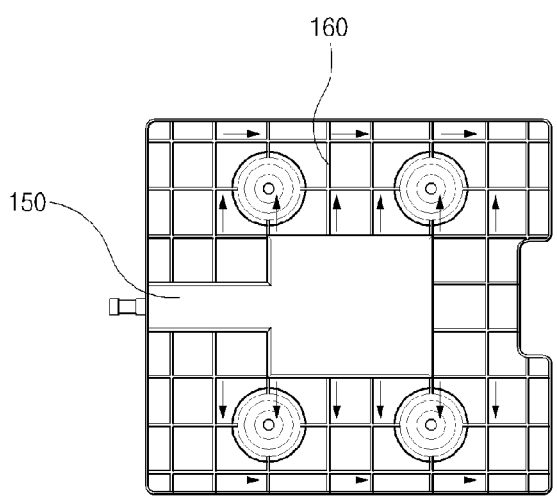
FIG. 3 is a view illustrating an installation state of fluid tubes of a battery cover with a fire-extinguishing function according to an embodiment of the present invention.

Referring to FIGS. 1 to 3, in a battery pack, which includes a case 100 accommodating a battery therein and a battery cover 130 disposed in an opening portion (not illustrated) of the case 100 to protect terminals (not illustrated) of the battery, a fire-extinguishing tank 150 for storing fire-extinguishing fluid therein is disposed on an inner surface of the battery cover 130 that faces the opening portion.

The case 100 provides a space in which the battery is accommodated, and may be configured in diverse shapes. In general, the case 100 is in the form of a hexahedron that has a hollow portion formed therein and an opening portion formed on one side thereof, and the battery is accommodated in the hollow portion. The battery pack corresponds to a known constituent element.

The cover 130 is shaped to correspond to the opening portion of the case 100 as described above, and the border of the cover 130 is bent on one side (hereinafter referred to as a "bent portion 135"). The bent portion 135 is configured to be somewhat wider than the opening portion of the cover, and is coupled to the opening portion of the case 100 as the opening portion of the case 100 is inserted into the bent portion 135. Further, a plurality of projections 137 are formed on an inner surface of the cover 130 at constant intervals to press and support the battery in the case where the cover 130 is coupled to the opening portion of the case 100 that accommodates the battery. As needed, the projections 137 may be omitted, and the detailed shape of the cover 130 may be diversely modified as needed.

On the inner surface of the battery cover 130, a fire-extinguishing tank 150, which stores fire-extinguishing fluid therein, is disposed to face the opening portion of the case 100 as described above. The battery cover 130 is generally made of plastic, but is not limited thereto. The fire-extinguishing tank 150 may be manufactured separately from the battery cover 130 to be coupled to the battery cover 130, but it is preferable that the fire-extinguishing tank 150 is integrally formed with the battery cover 130. The fire-extinguishing tank 150 is configured to be thinner than the bent portion 135 that is provided at the edge of the cover 130, and it is preferable that the fire-extinguishing tank 150 is located in the center portion of the cover 130. In this case, a filling hole 155 may be further formed on one side of the fire-extinguishing tank 150, and specifically, the filling hole 155 is formed to extend to an outer side of the battery cover 130, to penetrate the bent portion 135 of the battery cover 130, and to project to the outside. Further, at the end of the filling hole 155 that projects to the outside, a check valve (not illustrated) is provided to prevent the fire-extinguishing fluid and compressed air that fill the fire-extinguishing tank 150 at high pressure from flowing backward and leaking to the outside. The fire-extinguishing fluid and the compressed air fill the fire-extinguishing tank 150 through the filling hole 155.

The fire-extinguishing tank 150 is designed to endure a predetermined pressure. Accordingly, if a fire occurs in the battery and the fire-extinguishing fluid and the compressed air injected into the fire-extinguishing tank 150 are thermally expanded to increase the pressure in the fire-extinguishing tank 150 over the predetermined pressure, the fire-extinguishing tank 150 bursts and the fire-extinguishing fluid is sprayed to the outside, i.e., to the interior of the case in which the battery is accommodated.

In a preferred embodiment of the present invention, a plurality of fluid tubes 160 are provided on the whole surface of an inside of the battery cover 130 to communicate with the fire-extinguishing tank 150 so that the fire-extinguishing fluid that fills the fire-extinguishing tank 150 is uniformly distributed over the whole surface of the battery cover 130 along the fluid tubes 160. In this case, it is preferable that the fluid tubes 160 are arranged in a lattice or radial shape around the fire-extinguishing tank 150, and a part or the whole of the fluid tubes 160 are connected to other adjacent fluid tubes 160. The arrangement of the fluid tubes 160 as described above is according to the preferred embodiment of the present invention, and may not be limited to any specific shape. It is possible to provide the arrangement with various shapes which can uniformly distribute the fire-extinguishing fluid on the inner surface of the battery cover.

In the same manner as the fire-extinguishing tank 150, the fluid tubes 160 are designed to burst if the inner pressure exceeds the predetermined pressure. Accordingly, if the fire occurs on a part of the battery, the fluid tubes 160, which are arranged on a portion of the battery cover 130 that corresponds to the part, burst to spray the fire-extinguishing fluid intensively to the fire occurrence region to thereby suppress the fire at early stages. As needed, the fluid tubes 160 may extend not only to the inner surface of the battery cover but also to the bent portion 135.

As the fire-extinguishing fluid that fills the fire-extinguishing tank 150, a fire-extinguishing fluid for electrical fire (C-class fire) or a fire-extinguishing fluid for chemical fire (B-class fire) may be mainly used. However, the fire-extinguishing fluid is not limited thereto, and any known fire-extinguishing fluid, which can be thermally expanded when the fire occurs, may be used. An example of the fire-extinguishing fluid that can be used in the battery cover with the fire-extinguishing function is disclosed in Korean Registered Patent No. 0436331. Since the technology to make a fire-extinguishing fluid and a fire-extinguishing tank burst at a predetermined pressure is known, the detailed description thereof will be omitted.

The description of the present invention as described above is exemplary, and it will be understood by those of ordinary skill in the art to which the present invention pertains that various changes in form and detail may be made therein within the scope of the present invention. Accordingly, the scope of the present invention should not be defined by the above-described embodiment, but should be defined by the following claims and their equivalents.

INDUSTRIAL APPLICABILITY

As apparent from the above description, the battery cover with a fire-extinguishing function according to the present invention is used to suppress a fire that occurs in the battery for a vehicle or a construction machine at early stages.

The invention claimed is:

1. A fire-extinguishing battery cover comprising:
   a main body including an outer surface and an inner surface opposite to the outer surface, the inner surface configured to face an interior of a battery case when the fire-extinguishing battery cover is coupled to the battery case;
   a side portion extending from an outer edge of the inner surface of the main body;
   a fire-extinguishing tank on the inner surface of the main body and configured to store fire-extinguishing fluid therein;
   a filling portion extending from the fire-extinguishing tank to the side portion and through the side portion, the filling portion in fluid communication with the fire-extinguishing tank to convey the fire-extinguishing fluid into the fire-extinguishing tank; and
   a plurality of fluid tubes on the inner surface of the main body and in fluid communication with the fire-extinguishing tank to distribute the fire-extinguishing fluid stored in the fire-extinguishing tank over the inner surface;
   wherein the fire-extinguishing tank and the plurality of fluid tubes are configured to burst when the fire-extinguishing fluid rises to a predetermined pressure in response to a fire such that the fire-extinguishing fluid is dispersed into the battery case and onto a battery therein when the fire-extinguishing battery cover is coupled to the battery case.

2. The fire-extinguishing battery cover of claim 1, wherein the filling portion protrudes outward beyond an outer surface of the side portion.

3. The fire-extinguishing battery cover of claim 2, wherein the filling portion defines a filling hole at an outermost end thereof.

4. The fire-extinguishing battery cover of claim 3, further comprising a check valve at an end of the filling hole.

5. The fire-extinguishing battery cover of claim 1, wherein the fluid tubes are arranged in a lattice shape about the fire-extinguishing tank.

6. The fire-extinguishing battery cover of claim 1, wherein the fluid tubes extend radially from the fire-extinguishing tank.

7. The fire-extinguishing battery cover of claim 1, wherein the fluid tubes are located on an entirety of the inner surface of the main body.

8. The fire-extinguishing battery cover of claim 1, further comprising a plurality of projections extending from the inner surface inboard from the side portion.

\* \* \* \* \*